Aug. 13, 1963 H. W. KNOX 3,100,318
MOLD IDENTIFICATION PLUG
Filed April 7, 1959

United States Patent Office 3,100,318
Patented Aug. 13, 1963

3,100,318
MOLD IDENTIFICATION PLUG
Harold W. Knox, Akron, Ohio, assignor to The Firestone Tire & Rubber Company, Akron, Ohio, a corporation of Ohio
Filed Apr. 7, 1959, Ser. No. 804,636
1 Claim. (Cl. 18—44)

This invention relates to means for marking the surfaces of molded plastic or rubber articles, and more especially to a throwaway indicia bearing plug adapted to be inserted in recesses in rubber and plastic molds. In the manufacture of molded rubber articles it is desirable to impress in the surface of the rubber indicia indicating such information as date, size, etc. Before the present invention, such indicia was impressed on a plug which was inserted in the mold and which, after use in the molding operation, was removed for reuse or thrown away. However, such prior art plugs were normally dovetailed to fit into a complementary recess in the mold screwed into the mold itself or anchored in other ways which required that the plug be drilled out, jacked out, or that the mold itself be drilled and damaged. Also, it was often necessary to remove the mold from the curing press to remove the plug and this was a laborious and expensive operation.

The present invention overcomes the foregoing difficulties of the prior art by providing a light weight metal plug which may be easily pried out of the mold and thrown away.

It is, therefore, an object of the invention to provide means for easily changing indicia markings used on the surface of molded rubbery articles. It is also an object of the invention to provide a superior marking element at low cost for use in a tire vulcanizing mold. Yet another object of the invention is to provide a method of marking vulcanized rubber objects during vulcanization of such objects in a mold.

These and other objects of the invention will appear from the following description and the accompanying drawings, of which:

Figure 1:
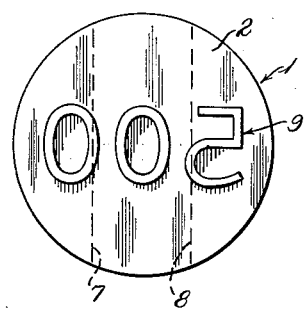
FIGURE 1 is a plan view of a removable plug of the invention.

Referring to the drawing in which the preferred form of the invention is used in a tire vulcanizing mold, the plug generally indicated at 1 is comprised of a flat top portion 2 merging into two depending side members 3 and 4, each having segmented frusto conical outer surfaces 5 and 6 and inwardly facing flat wall surfaces 7 and 8 respectively, forming a slot running across the width of the plug. The top surface of the portion 2 is provided with raised indicia 9, although it is understood that the indicia may be intaglio on the portion 2.

Figure 3:
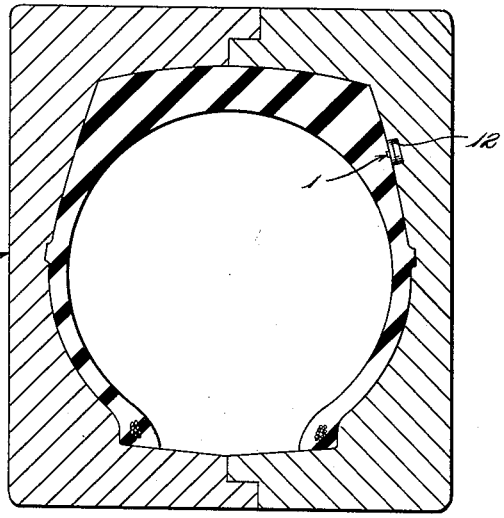
FIGURE 3 is a fragmentary sectional view of a tire vulcanizing mold incorporating the invention.

Referring to FIGURE 3, the relation of the plug 1 of the invention to a tire vulcanizing mold generally indicated at 10, is shown. The surface of the mold has been drilled to form a recess having a cylindrical wall 12 of about the same diameter as the diameter of the portion 2. The relation of these diameters is such that the plug has a light press fit with respect to the wall 12 and may be driven easily into the recess during installation in the mold.

The material from which the plug is made may be precast aluminum or other light weight metal or plastic which is readily punctured by a pointed instrument but which still has enough strength to withstand the pressure of being driven against press fit into the recess 12. When the plug 1 is inserted in the recess 12, indicia 9 protrudes above the inner surface of the mold member 10 to be impressed into the soft, hot rubber during vulcanization of the tire. The indicia may be indented into the surface of plug so as to produce raised letters on the surface of the molded tire.

Figure 4:
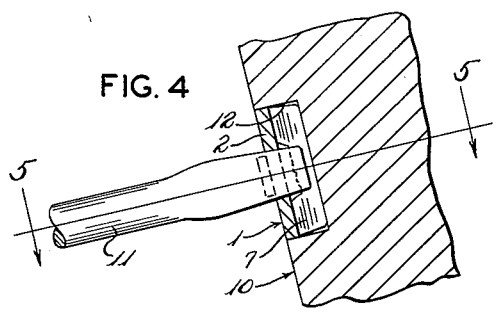
FIGURE 4 is an enlarged fragmentary sectional view showing the removal of the plug from a vulcanizing mold.
Figure 5:
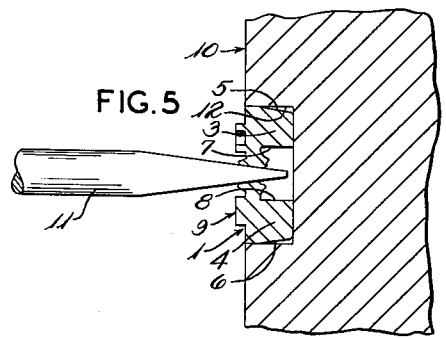
FIGURE 5 is a sectional view taken on line 5—5 of FIGURE 4.

When it is desired to change the indicia molded into the surface of the rubber article a screwdriver 11 or other prying instrument is driven through the top member 2 so that its end protrudes into the slot formed by the walls 7 and 8 of the members 3 and 4 (FIGURES 4 and 5). The defromation of the plug by driving the screw driver 11 through and the tapered walls 5 and 6 of members 3 and 4 permit pivoting to loosen the plug in the hole so that it is easily withdrawn. Another plug of the same diameter is selected with a different desired indicia and is driven into the recess 12 by a light tap of a hammer or rubber mallet.

Figure 6:
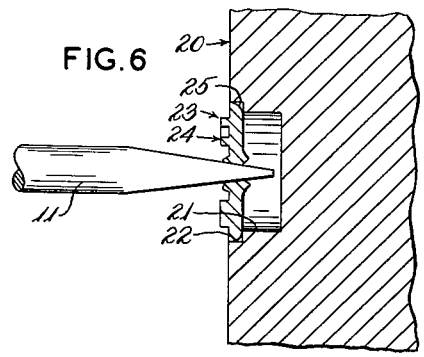
FIGURES 6 and 7 are modifications of the invention.

In the modification of the invention shown in FIGURE 6, a mold generally indicated at 20 is provided with a recess having cylindrical walls 21 and 22 respectively, of different diameters. The metal plug 23 is of a shape and diameter such that it forms a light press fit with respect to the walls 22 of the recess. The top of the plug bears molding indicia 24 while the lower edges of the plug have radius surfaces 25. The plug is of a material such as cast aluminum which is easily pierced by screwdriver 11 and pried out of the mold.

Figure 7:
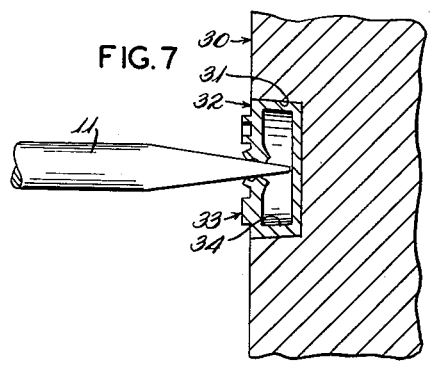

In the modification of the invention shown in FIGURE 7, a mold 30 is provided with tapered walls 31 designed to form a light press fit with the outer frustro conical walls of plug 32 mounting indicia 33. Plug 32 is provided with an inner chamber 34 to receive the point of screwdriver 11 when the plug is removed as aforedescribed.

The inveniton is useful in any mold in which natural or synthetic rubber or plastic is formed or shaped under pressure. These materials may be formed either with or without heat but under pressure. These materials, both rubber and plastic, are categorized herein as plastic materials for the purpose of the specification and claims.

Figure 2:
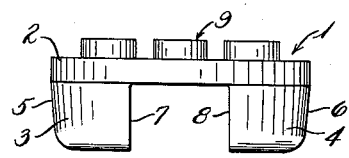
FIGURE 2 is a side elevation of the removable plug of the invention.

In one specific example of the invention, the plug of FIGURES 1 and 2 comprises a precast aluminum member anodized after forming and of a diameter across its top of .625 inch. The side walls of the plug comprise a .040 high cylindrical surface on member 2 tapering from its base .194 inch at a 5° taper to the base of the plug. The indicia are raised .040 inch above the molding surface of the plug while the width of the slot formed by walls 7 and 8 of members 3 and 4 is .250 inch. The depth of the slot is .194 inch. The aforedescribed plug fits into a recess in the mold (FIGURE 3) having cylindrical walls 12 of .625 inch in diameter and a height of .234 inch.

It will be seen from the foregoing description that an inexpensive, easily removable indicia-bearing plug has been provided for use in the marking of vulcanized rubbery objects. The plug is not only inexpensive but provides means for quickly and efficiently changing indicia marking surfaces in a mold and replacing such surfaces with a plug having a surface inscribed with the desired indicia.

What is claimed is:

In a molding device, the combination of a mold having a surface forming a cavity for shaping a moldable article and an indicia-bearing plug for providing a marking on said article, said mold having a shallow recess in a wall of said mold cavity surface providing a chamber in said surface to receive said plug, said plug being of such size and configuration as to mate with the walls of said recess with a light press fit, depending, substantial, rigid, spaced apart portions of said plug bottoming in said recess, an outer wall portion of said plug having an indicia-bearing surface complementary to said mold surface connecting said depending portions and thereby forming a hollow space in communication with said chamber, said outer wall portion being between said depending portions relatively thin and of a material easily penetrable by a prying instrument but substantially undeformable by molding forces, whereby said prying instrument may be forced through said outer wall into said hollow space and pivoted to remove said plug from said chamber.

References Cited in the file of this patent

UNITED STATES PATENTS

| | | |
|---|---|---|
| 1,058,210 | Welch | Apr. 8, 1913 |
| 1,158,073 | Payne | Oct. 26, 1915 |
| 1,191,820 | Pannier | July 18, 1916 |
| 1,567,402 | Venn | Dec. 29, 1925 |
| 1,853,944 | Unke | Apr. 12, 1932 |
| 2,679,663 | Schwemler et al. | June 1, 1954 |
| 2,705,088 | Blarcom | Mar. 29, 1955 |